April 15, 1941.　　C. A. NERACHER ET AL　　2,238,746
POWER TRANSMISSION
Filed July 29, 1938　　5 Sheets-Sheet 1
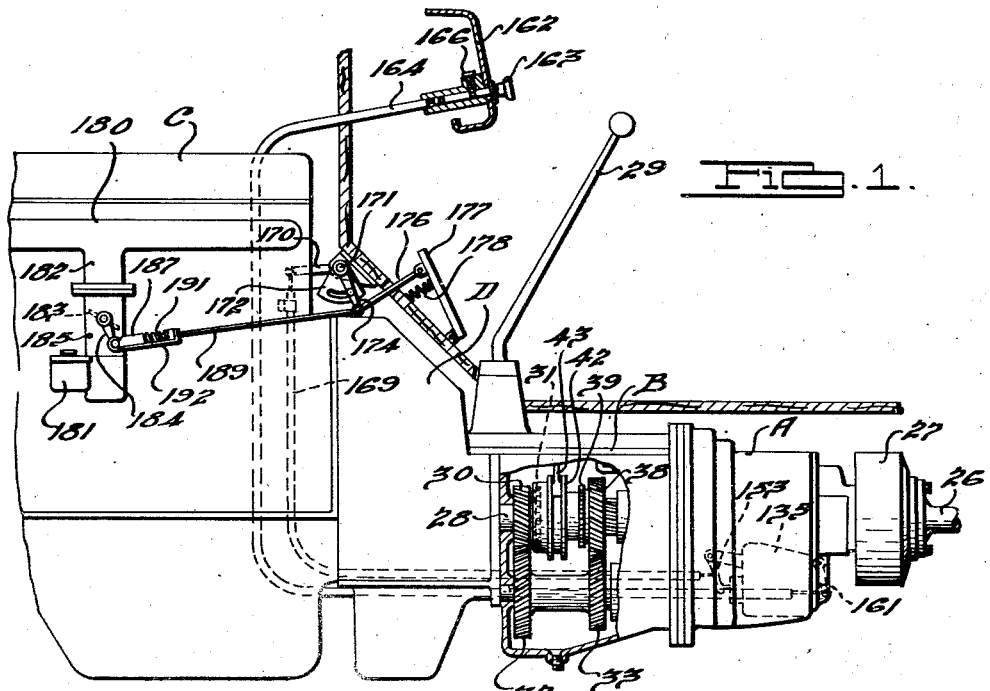
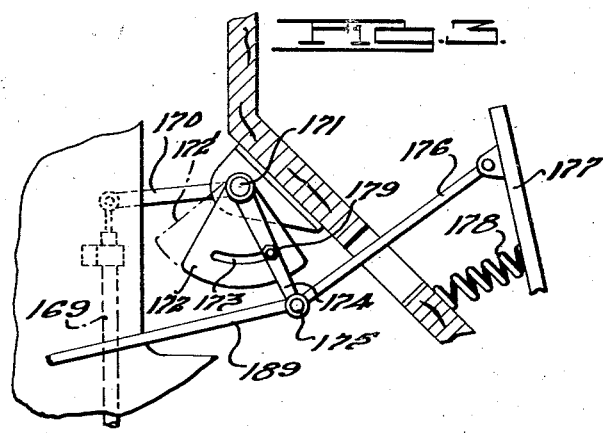
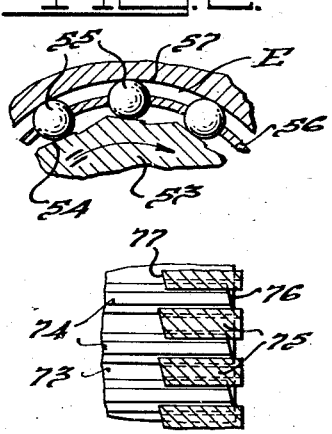
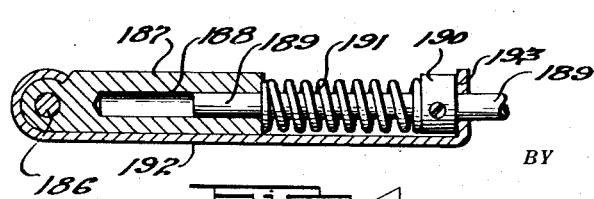
INVENTORS.
Carl A. Neracher,
William T. Dunn,
Augustin J. Syrovy,
Teno Iavelli.
BY
ATTORNEYS.

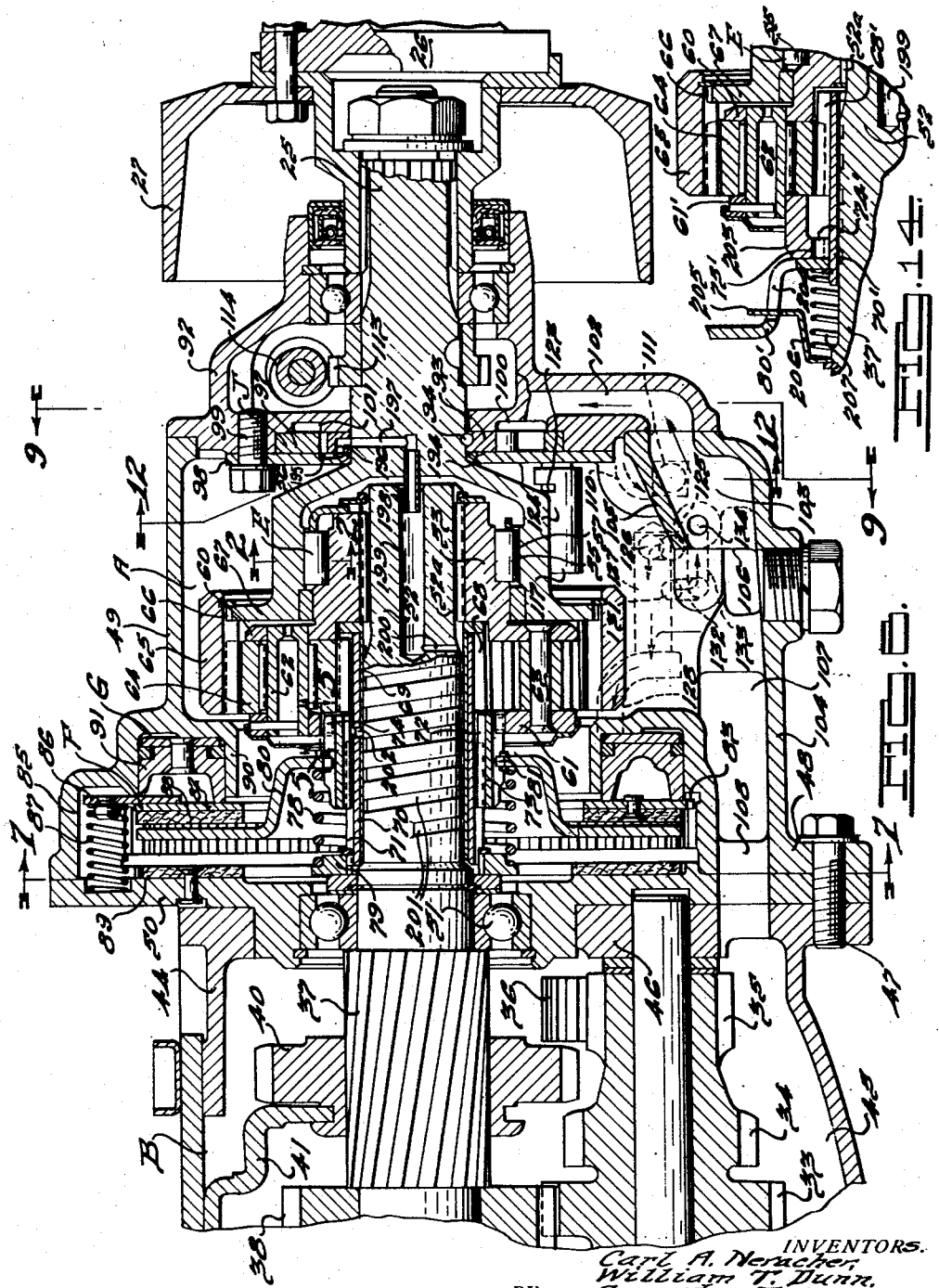

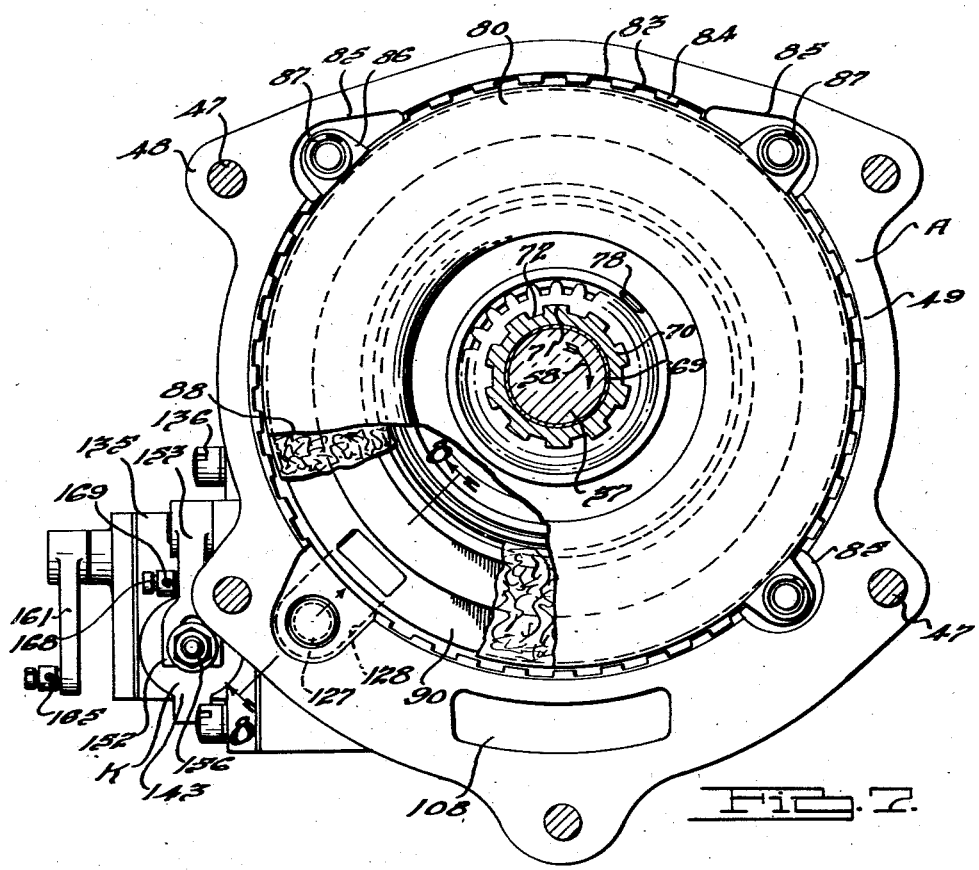
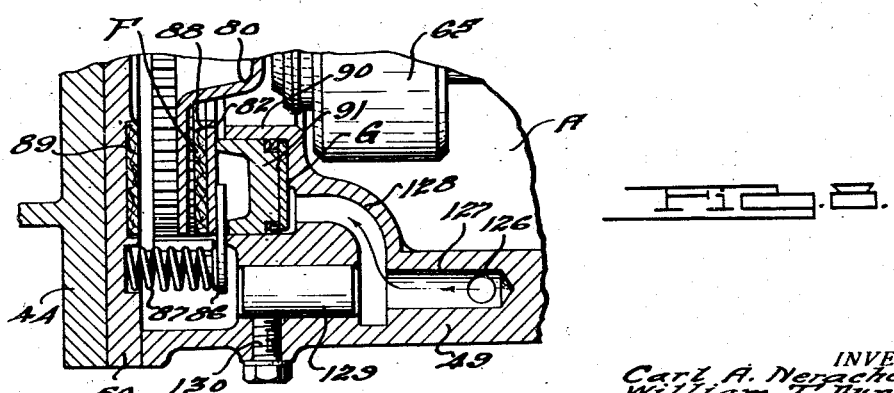

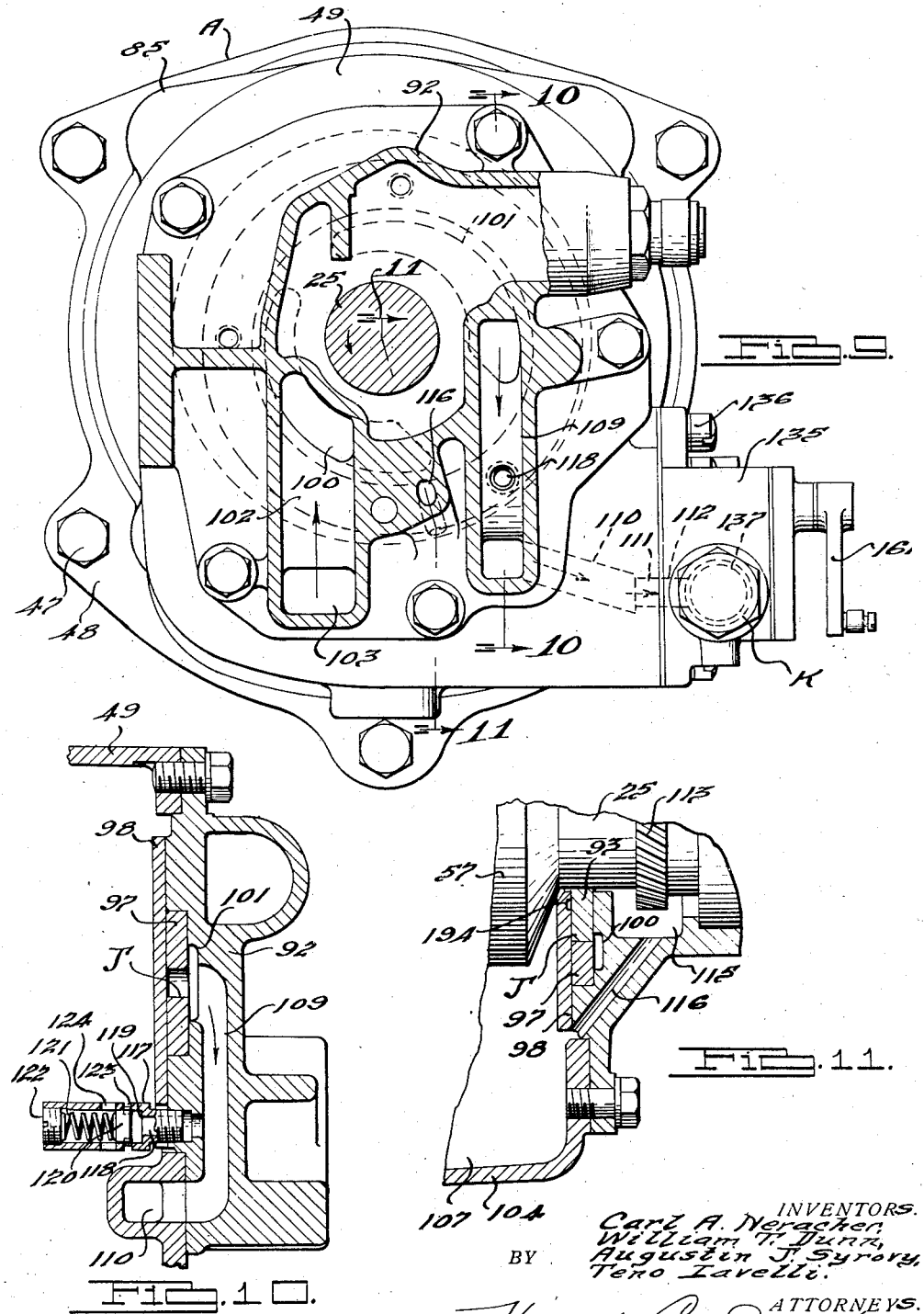

April 15, 1941.   C. A. NERACHER ET AL   2,238,746
POWER TRANSMISSION
Filed July 29, 1938   5 Sheets-Sheet 5

INVENTORS.
Carl A. Neracher,
William T. Dunn,
Augustin J. Syrovy,
Teno Iavelli.
BY
ATTORNEYS.

UNITED STATES PATENT OFFICE 2,238,746

POWER TRANSMISSION

Carl A. Neracher, William T. Dunn, Augustin J. Syrovy, and Teno Iavelli, Detroit, Mich., assignors to Chrysler Corporation, Highland Park, Mich., a corporation of Delaware Application July 29, 1938, Serial No. 222,006

38 Claims. (Cl. 74—260)

This invention relates to power transmissions and refers more particularly to improvements in speed ratio changing mechanism especially adapted for use in driving motor vehicles.

More particularly, our invention relates to change speed transmissions wherein the speed ratio drive for the vehicle is changed by an improved and simplified arrangement of control mechanism.

While our invention is applicable, in the broader aspects thereof, to a variety of speed ratio gearing arrangements to provide speed changes above or below a direct drive from the transmission drive shaft to the vehicle drive shaft, we have illustrated the principles of our invention in connection with an overdrive mechanism wherein the driven shaft is at times driven faster than that of the driving shaft.

The advantages of overdrive are well known in the art, especially since overdrive mechanisms have been used commercially in recent years. One type of overdrive, which is well known at this time, comprises a planetary gearing and automatic synchronous centrifugal force clutch control so arranged that when the engine drives in the direct speed ratio, viz. 1 to 1, at or above the critical speed of engagement of the centrifugal clutch, this clutch may be engaged by momentarily reducing the speed of the engine by the amount of the overdrive gear train in order to synchronize the clutch members to establish the overdrive. The clutch is disengaged when the vehicle speed is reduced to some predetermined desired point below its speed corresponding to the critical speed of engagement of the automatically operating clutch.

One disadvantage of the foregoing type of overdrive, in common with other types of overdrives and many change speed devices in general, is that when the vehicle is driven in the fastest speed ratio drive the engine torque is relatively low in comparison with slower speed ratio drives and the engine lacks the desired power for quickly passing another vehicle or for climbing a hill.

It is an object of our invention to provide an improved change speed mechanism wherein speed ratio drives may be conveniently and quickly changed by the vehicle driver without shock or jolt, preferably in response to manually operable mechanism such as the usual engine throttle-adjusting accelerator pedal. Our mechanism is preferably so arranged that the accelerator pedal may be depressed to overtravel the engine throttle when fully open to thereby manipulate the change speed mechanism for drive in a slower speed ratio, such arrangement being conveniently termed a "kick-down" control. We preferably employ an accelerator pedal control since the driver ordinarily has his foot on this pedal and naturally depresses the pedal when further power delivery from the engine to the vehicle is desired.

Another object of our invention is to provide an improved driver controlled change speed mechanism, preferably in the form of a kick-down control, wherein the fastest speed ratio is preferably an overdrive controlled by pressure fluid operating means adapted for operation at a predetermined desired speed of vehicle travel. With such an arrangement the critical speed of operation of the pressure fluid means may be set or arranged to operate relatively low because when the overdrive is in operation there is instantly and conveniently available a control on the change speed mechanism to smoothly obtain a slower and more powerful drive so that the benefits of economy, quietness and the like may be obtained by using the overdrive throughout a greater range of vehicle speed than might otherwise be deemed practicable. Obviously, however, the overdrive may be arranged to be operative at any speed desired. The fluid employed is preferably oil under pressure although other fluids such as air may be employed at greater or less than atmospheric pressure.

Another object of our invention is to provide an improved pressure fluid control for the change speed mechanism, preferably by incorporating a simplified and improved lubricating system in conjunction with the kick-down mechanism.

Another object of our invention is to provide an improved overdrive transmission which affords a two-way direct drive as well as a two-way overdrive thereby obtaining benefits of engine braking in direct drive and providing a reverse drive which does not require lockout mechanism for an overrunning clutch as has heretofore been customary with overdrive devices of the aforesaid well known type.

A further object is to provide an improved arrangement of transmission drive and control parts affording unusually smooth speed ratio change without shock or jolt to the parts or vehicle passengers; also to provide pressure fluid control means preferably operable in response to predetermined speed of the vehicle for stepping up the drive (as from direct to overdrive) even under conditions of continued torque delivered by the engine so that it is not necessary for the driver to even momentarily release the accelerator pedal in going from direct to overdrive.

Furthermore, our device provides means for effecting automatic change both from direct to overdrive and from overdrive to direct in response to the speed of travel of the vehicle independently of the engine speed. Preferably therefore our fluid pressure control comprises a pump driven by a part operably connected with the vehicle ground wheels, as the output shaft of the complete power transmission.

Other objects of our invention are to provide improved change speed mechanism automatically operable to provide varying speed ratios best suited to the requirements or conditions of motor vehicle drive. By reason of our invention the vehicle is operated very efficiently without sacrificing rapid accelerating ability.

Further objects and advantages of our invention will be more apparent as our specification progresses, reference being had to the accompanying drawings which illustrate several embodiments of our invention and wherein:

Fig. 1 is a side elevational view, somewhat diagrammatic in form, illustrating our power transmission system as a whole, a portion of the casing of the main speed ratio changing transmission being broken away to illustrate the gearing.

Fig. 2 is a detail fragmentary sectional elevational view taken as indicated by the line 2—2 of Fig. 6 illustrating the overrunning clutch which forms a direct drive releasable connection between the driving and driven shafts of the overdrive mechanism.

Fig. 3 is a detail enlarged sectional elevational view of a portion of the engine throttle valve adjusting and kick-down mechanism illustrated in Fig. 1.

Fig. 4 is an enlarged sectional elevational view of the lost-motion connecting device in the throttle-operating mechanism of Fig. 1.

Fig. 5 is an enlarged sectional plan view illustrating the development of a portion of the clutch teeth as seen at the section line 5—5 of Fig. 6.

Fig. 6 is a sectional elevational view through the overdrive mechanism and a portion of the main speed ratio changing transmission.

Fig. 7 is a sectional elevational view taken approximately as indicated by line 7—7 of Fig. 6, with parts broken away.

Fig. 8 is a detail sectional view illustrating the pressure fluid inlet to the motor for actuating the sun gear brake, the view being taken as indicated by line 8—8 of Fig. 7.

Fig. 9 is a sectional elevational view looking forwardly as indicated by line 9—9 of Fig. 6.

Fig. 10 is a detail sectional elevational view taken as indicated by line 10—10 of Fig. 9.

Fig. 11 is a further sectional elevational view taken along line 11—11 of Fig. 9.

Fig. 14 (sheet 2) is a fragmentary sectional elevational view illustrating a modified form of shift clutch control for substitution in the Fig. 1 mechanism.

Figures 12, 13:
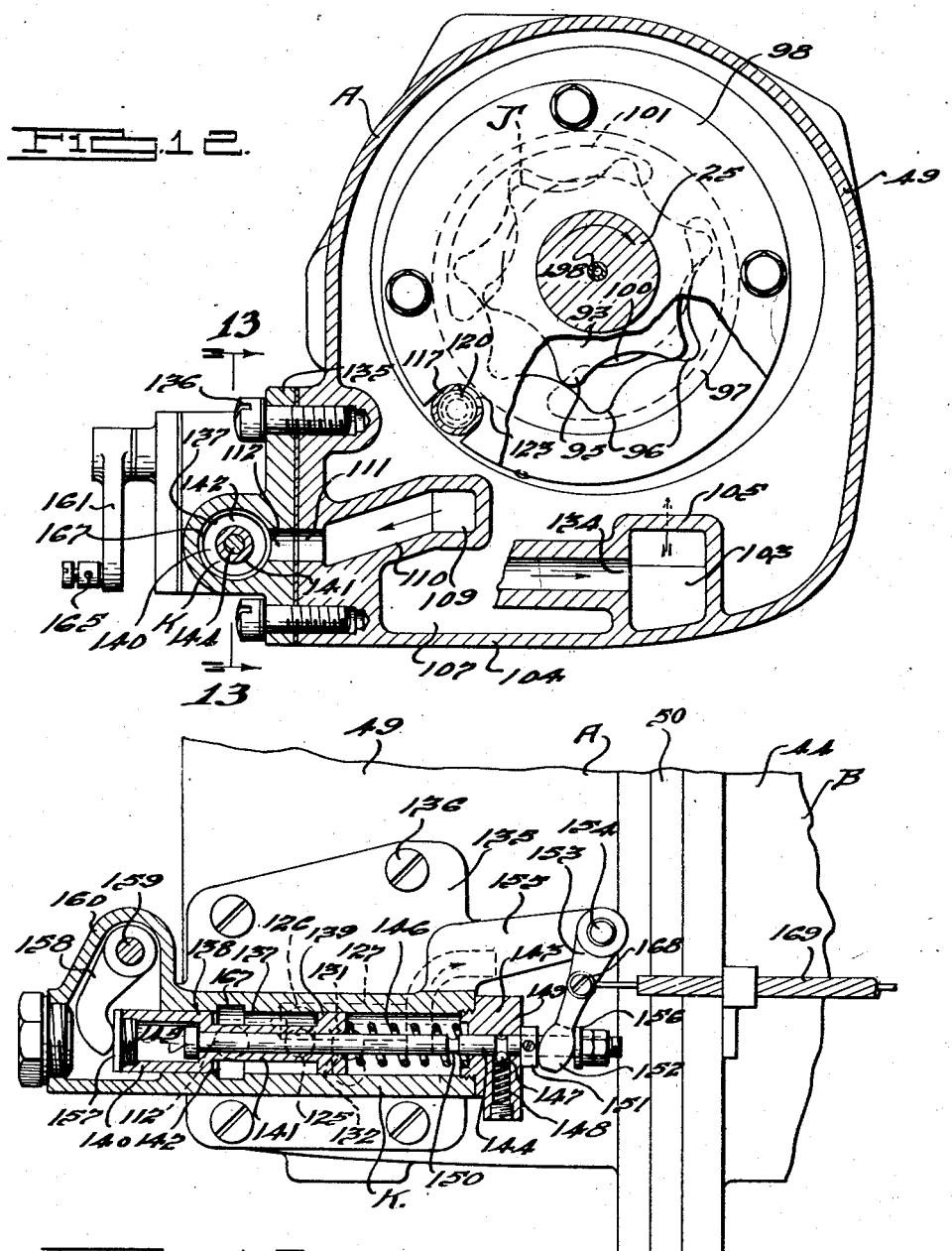
Fig. 12 is a sectional elevational view taken as indicated by line 12—12 of Fig. 6 with parts of the pump casing broken away.
Fig. 13 is a sectional elevational view taken as indicated by line 13—13 of Fig. 12 illustrating the valve control mechanism.

Referring to the drawings, we have illustrated our over-driving mechanism A interposed between a speed ratio changing main transmission B and a driven shaft 25, and its extension 26, the latter extending rearwardly to drive the rear wheels (not shown) of the motor car or vehicle in the usual well known manner, it being understood that we have elected to show our invention in association with a motor vehicle drive although in its broader aspects, it is not necessarily limited thereto. The customary propeller shaft brake drum 27 is illustrated between shafts 25 and 26 as comprising a part of the drive from the overdriving mechanism A to the vehicle.

Our driving mechanism may be used to advantage at various other points in the line of general power transmission between the vehicle engine C and the driven wheels, or between driving and driven means such as shafts of other types of devices. In accordance with customary practice, the drive from engine C to the main transmission B is controlled by a clutch D of any suitable type, this clutch transmitting the drive to the main transmission by a shaft 28.

The transmission B may be of any suitable type, such as the conventional selector type operated in the well known manner by manipulation of the gear shift lever 29 and the usual selector controls, whereby the various adjustments may be made to the transmission in order to provide forwardly driving speed ratios and a reverse drive through the transmission.

Inasmuch as the type of transmission illustrated at B is well known in the art, we have shown only a portion of the operating mechanism in Figs. 1 and 6. Shaft 28 carries the countershaft driving pinion 30 and also the direct drive clutch teeth 31, pinion 30 meshing with the driving gear 32 of the countershaft cluster gearing which further includes a second speed drive gear 33, a low speed drive gear 34, and a gear 35 in constant mesh with a reverse idler gear 36. Loosely mounted on the transmission power take-off shaft 37 for rotation relative to this shaft, is the usual second speed gear 38 in constant mesh with the countershaft gear 33, a set of second speed clutch teeth 39 being driven with gear 38.

Splined on the shaft 37 for shifting movement along this shaft is the low and reverse gear 40 shiftable by a fork 41 under control of the gear shift lever 29. When the gear 40 is shifted forwardly into mesh with countershaft gear 34, shaft 37 will be driven from shaft 28 in a forward low speed ratio drive through the gear train 30, 32, 34 and 40. When the gear 40 is shifted rearwardly to mesh with the reverse idler gear 36, shaft 27 will be driven backwards or in reverse relative to the forward direction of rotation of the shaft 28 through the gear train 30, 32, 35, 36 and 40.

In order to selectively drive shaft 37 in the second or intermediate speed ratio, and also in a direct drive, the usual shiftable clutch 42 is provided operable by the fork 43 under control of the gear shift lever 29, this clutch 42 being drivingly connected to the shaft 37 and adapted for selective forward and rearward shifting movements respectively to clutch with the direct drive clutch teeth 31 or the second speed drive clutch teeth 39. During the direct drive, the parts being positioned as shown in Fig. 1, shaft 28 drives the shaft 37 by reason of engagement of clutch teeth 31 with the corresponding teeth of the shiftable clutch 42. During the second speed drive the shaft 37 is driven at a reduction speed ratio greater than that provided by the low speed ratio drive, by reason of the gear train 30, 32, 33, 38, clutch teeth 39, and shiftable clutch member 42.

The main transmission B has the aforesaid gearing disposed within a casing 44 which provides a reservoir or sump 45 for storing a suitable lubricating oil which is preferably circulated, as will be presently more apparent, between the transmission B and the overdriving mechanism A and this lubricating oil is preferably used as the fluid medium for effecting operation of the secondary controlling means for the overdriving mechanism. The transmission casing 44 is formed with a rear annular wall 46 secured by fasteners 47 to the forward wall or flange 48 of the casing 49 for containing the overdriving mechanism A. Secured between walls 46 and 48 there is located an intermediate member 50.

The transmission shaft 37 is the driving shaft for the overdrive mechanism A and is journalled in a bearing 51 carried by the intermediate member 50, the shaft 37 having a rearward driving extension 52 which projects into the overdrive casing 49 and which is formed with splines 52ª.

Engaging splines 52ª at the rear end of driving shaft extension 52, is the inner member 53 of an overrunning clutch E which provides a releasable forward direct driving means from shaft 37 to the driven shaft 25. The overrunning clutch functions only at such times when the two-way direct drive means does not operate for any reason, as will presently be apparent. Normally, this overrunning clutch E plays a very minor part in the mechanism. As best shown in Figs. 2 and 6, the inner member 53 is formed with the usual cam faces 54 engaged by clutching rollers 55, the rollers being spaced by the usual cage 56. The outer member of the overrunning clutch E comprises a cylinder 57 formed as an enlarged forward projection of the driven shaft 25. When the driving shaft 37 has a forward direction of rotation imparted thereto, as indicated by the arrow 58 in Fig. 7, and with the overdriving mechanism inoperative, the rollers 55 will be wedged between the inner and outer member 53 and 57 respectively of the overrunning clutch E so that the driven shaft 25 will be driven in a forward direction with the driving shaft 37. However, in the event that the driving shaft tends to slow down relative to the driven shaft, or in the event that the driven shaft tends to rotate forwardly faster than the driving shaft, the rollers 55 will be released from wedging action and such tendencies of the shafts to rotate relatively to one another will be readily accommodated.

Our mechanism A is arranged to provide a plurality of speed ratio drives between driving shaft 37 and driven shaft 25 and in the illustrated embodiment we have provided a relatively slow speed drive which is a direct or 1 to 1 ratio drive and a relatively fast drive which provides an overdrive whereby the driven shaft is rotated faster than the speed of the driving shaft. We preferably employ planetary gearing because of the recognized advantages of quietness of operation, simplicity, etc., although if desired, other forms of gearing may be employed.

The planetary gearing comprises an input planet pinion carrier structure 60 adapted to be driven directly from driving shaft 37, this carrier structure being conveniently formed as an extension of the overrunning clutch cam member 53. The carrier structure is provided with a forward carrier portion 61 connected to the portion 60 by a plurality of axle shafts 62 and spacing assemblies 63, one of these axles and spacing assemblies being illustrated in Fig. 6.

Rotatably journalled on each axle 62 is a planet pinion 64 meshing with an internal gear 65 drivingly secured at the splines 66 with a flanged extension 67 of the aforesaid driven shaft forward extension 57 of the overrunning clutch E. The planet pinions 64 also mesh with a hollow sun gear 68 having an internal lining of bearing material 69 whereby the sun gear is loosely journalled on the driving shaft extension 52 forwardly of the splines 52ª. The sun gear has a forwardly extending controlling hub 70 formed with axially extending splines 71 slidably engaging the internal splines 72 of a shiftable drive controlling sleeve 73 formed with external clutch teeth 74 adapted to clutchingly engage corresponding internal teeth 75 (Fig. 5) carried by the carrier member 61.

When the sleeve 73 moves rearwardly to clutch with the carrier portion 61, the teeth 74 and 75 are so constructed that they may relatively overrun without danger of injuring the teeth which are constructed so that they will engage only when the mating clutch teeth are rotated synchronously. Thus the end faces of teeth 74 are inclined at 76 and the forward ends of teeth 75 are correspondingly inclined at 77. This inclination is preferably in the neighborhood of five degrees, although for purposes of illustration, the inclination has been exaggerated in Fig. 5 and the inclination may be in the form of a thread-like spiral in order to insure full surface contact at the ends of the teeth or the end faces may be substantially flat. The direction of inclination is such as to permit the carrier and teeth 75 to rotate forwardly at a speed faster than forward rotation of the sun gear 68 and sleeve 73 carried therewith, the teeth 75 camming over the teeth 74.

In order to provide means for yieldingly urging rearward movement of sleeve 73 to effect clutching thereof with the carrier 61, we have provided yielding means in the form of a spring 78 acting between an abutment 79 and a disc 80, the inner portion of which is fixed to sleeve 73 by a splined engagement at 81 therewith. This disc 80 provides a braking element for arresting rotation of sun gear 68 when the sleeve 73 is moved forwardly to disengage clutch teeth 74 and 75 in order to effect the overdrive between driving shaft 37 and driven shaft 35. As a feature of our invention we have provided means preferably operated by pressure fluid for shifting the disc 80 and sleeve 73 forwardly in opposition to spring 78, the arrangement being such that this shifting action of the sleeve will take place even during a full torque application of the engine C in driving the driven shaft 25 directly from shaft 37 without requiring reduction in the torque of the engine as has heretofore been common in connection with transmissions employing overdrive gearing. By employing pressure fluid we are enabled to immediately obtain the desired relatively high pressure required to shift the sleeve 73 forwardly under the aforesaid conditions and also to hold the sun gear 68 against rotation while taking the drive reaction of the overdrive.

The pressure fluid operated means comprises a braking device, generally designated at F, adapted to be actuated to brake the disc 80 by a pressure fluid motor, designated as G. The braking device F comprises a pressure plate 82 externally splined at 83 to engage the internal splines 84 formed on the casing 49, the splines being interrupted at the outwardly extending casing pockets 85 into which project the fingers 86 which are welded to the pressure plate 82.

A coil spring 87 acts in each pocket 85 between the intermediate member 50 and a finger 86 to yieldingly urge the pressure plate 82 rearwardly in its released position, this pressure plate carrying on its forward face a ring of friction braking material 88 engageable with the rear face of the disc 80. The forward face of this disc was adapted to engage the braking material 89 fixed to the intermediate member 50.

The motor G comprises an annular cylinder 90 formed as a part of the casing structure 41 and opening forwardly to slidably receive the annular piston assembly 91 which engages the pressure plate 82 and is adapted to be urged forwardly by pressure fluid. Thus when pressure fluid is introduced to cylinder 90 at the rear of piston 91, as will presently be apparent, this piston is moved forwardly in cylinder 90, causing the pressure plate 82 to slide forwardly in the splines 84 into engagement with disc 80, this disc and the sleeve 73 then moving forwardly as a unit to disengage clutch teeth 74 from the carrier teeth 75 and to bring the disc 80 into braking engagement with the friction material 89 against the action of the springs 85 and 78 thereby securely holding the sun gear 68 against rotation as long as the fluid under the required pressure is being admitted to the cylinder 90.

When the pressure of the fluid in cylinder 90 is relieved or when the pressure drops below that required to maintain brake F in operation, the springs 78 and 87 will operate to return the parts to their illustrated positions in Fig. 6, the spring 87 acting to separate the friction material 88 from the disc 80 while the spring 78 yieldingly urged clutching engagement of teeth 74 with teeth 75. When the sleeve 73 is in its Fig. 6 clutched position, rearward movement of the sleeve is preferably limited by engagement of the sleeve with the teeth of sun gear 68 whereby the inclined ends 76 of teeth 74 do not project in contact with the planet pinions 64.

In the operation of the mechanism as thus far described and assuming a forward rotation of driving shaft 37 and with the parts positioned as in Fig. 6, a direct drive will take place to driven shaft 25 because sleeve 73 is operating to clutch the sun gear 68 with carrier 61 thereby locking the planetary gear train and causing the same to revolve as a unit with the driving and driven shafts, thus providing a two-way direct drive.

Assuming that while the direct drive is taking place by the application of torque from the engine, pressure fluid is introduced to cylinder 90. This will cause operation of motor G as aforesaid to shift sleeve 73 forwardly thereby disengaging clutch teeth 74 and 75 for releasing the sun gear 68 from the carrier 61, the sun gear then being arrested against rotation by operation of the braking device F. This will produce the overdrive and, under the aforesaid assumed conditions, will be accompanied by a forced retardation of driving shaft 37 by an amount equal to the value of the overdrive gear train when the braking device F operates to hold the sun gear 68. At such time the planet pinions 64 will be driven forwardly around the fixed sun gear 68 thereby causing the driven shaft 25 to rotate forwardly faster than the speed of the driving shaft, clutch E overrunning.

Whenever the pressure fluid drops in cylinder 90 below the critical pressure required to operate braking device F, this braking device will be released and a step-down will take place in mechanism A by changing the drive therethrough from the overdrive to a direct drive. This change in speed ratio drive is also adapted to take place even in times when the engine is delivering its maximum torque and assuming that the cylinder 90 is vented under such conditions, it will be apparent that braking device F will be released, spring 78 moving sleeve 73 rearwardly. When the braking device F releases, the sun gear 68 and sleeve 73 which were previously held against rotation now quickly accelerate forwardly at the time that sleeve 73 is shifted rearwardly. It will frequently occur that the sleeve 73 will be accelerated to a speed equal to that of carrier 61 so that the sleeve will clutch with the carrier to provide the direct drive under the aforesaid assumed conditions. However, should the teeth 74 not clutch with the teeth 75, the sleeve 73 cannot rotate forwardly faster than carrier 61 because overrunning clutch E will immediately come into operation to establish the direct drive from driving shaft 37 to driven shaft 25.

When the overrunning clutch thus operates, the faces 76 of teeth 74 will be engaged with the faces 77 of teeth 75 and the next time that the driver partially releases the usual accelerator pedal to allow the driven shaft to overrun the driving shaft, spring 78 has sufficient strength that it will then act to force the teeth 74 into clutching engagement with teeth 75 as soon as teeth 74 slide off the faces 77 of teeth 75. During this overrunning action the sun gear and sleeve 73 will slow down at a faster rate than the carrier 61 so that the relative change in speeds of teeth 74 and 75 is not abrupt but is sufficiently gradual to permit clutching engagement of these teeth under these conditions.

Our experience has been that it is impossible, with the parts properly proportioned, to cause the teeth 74 to ratchet over the teeth 75 during this overrunning action because clutching of these teeth will immediately take place. However, if for any reason such overrunning action of the teeth took place, clutching engagement of these teeth would obviously take place the next time that the engine is accelerated to drive the car because the inclined faces 77 would then guide the faces 76 of teeth 74 into clutching engagement with the teeth 75, as will be readily understood.

In driving the vehicle in reverse by the aforesaid manipulation of shift lever 29 to engage gear 40 with the reverse idler gear 36, our mechanism operates so that it does not require any lockout means for the overrunning clutch E. Before driving in reverse the vehicle is obviously first brought to a standstill and as we preferably supply pressure fluid to cylinder 90 from a pumping means driven from or with the driven shaft 25, it will be apparent that when the vehicle pump is at rest, the pump will not operate and the pressure fluid will drop at cylinder 90, thereby releasing braking means F to allow the sleeve 73 to move rearwardly and clutch with the carrier 61 to enable the reverse drive from shaft 37 to driven shaft 25. If the teeth 74 should not clutch with the teeth 75 but merely engage the faces 77, then as soon as the driving shaft 37 starts to rotate backwards for the reverse drive, the sun gear 68 and sleeve 73 will rotate backwards faster than backward rotation of carrier 61 and the spring 78 will immediately cause the teeth 74 to clutch with the teeth 75 just as soon as teeth 74 slide off the faces 77.

We have also provided means for venting the cylinder 90 under control of the vehicle driver independently of the speed of the vehicle drive which will be presently apparent so that, if desired, such means may be utilized to release the braking means F to enable the reverse drive and this means may be of particular advantage where a pressure fluid pump is employed of the type which will pump during reverse rotation of the driven shaft so that there would be no tendency to engage the overdrive where the vehicle is driven in reverse at a speed sufficient to build up enough pressure at cylinder 90 to operate motor G.

We will now describe the pressure fluid pumping means for supplying pressure fluid to the motor G, this means being preferably so arranged that when the vehicle is accelerated in the direct drive up to a predetermined desired speed, the pump will build up sufficient pressure to automatically cause operation of motor G to effect the change in mechanism A from the direct drive to the overdrive. Likewise when the speed of travel of the motor vehicle drops below a predetermined desired critical speed, then the pressure of the fluid at motor G will drop causing the overdrive to be released automatically and the direct drive to immediately take place as the engine speeds up, either by engagement of the overrunning clutch E or by clutching the sun gear with the carrier, as aforesaid.

Our pumping means, generally designated at J, is preferably driven directly from driven shaft 25 although, if desired, the pumping means may be driven with any part which is drivingly connected to this shaft so as to produce pressure in response to motion of the vehicle. Our pumping means is carried in a casing 92 secured at the rear of casing 49 and comprises a driving pump member 93 (Figs. 6 and 12) drivingly connected by ball 94 with the driven shaft 25, the member 93 having tooth-like projections 95 of a well known type adapted for driving engagement with corresponding recesses 96 in the pump driven member 97 which is eccentrically mounted in the casing 92, the recesses being one more in number than the teeth 95 as is common with the type of pump illustrated. A closure plate 98 is secured by fasteners 99 to the casing 92 and engages the forward faces of the pump members 93 and 97.

The casing 92 is provided with the crescent-shaped intake and pressure delivery ports 100 and 101 respectively, the intake port (Figs. 6 and 9) communicating with a downwardly extending passage 102 formed in casing 92 and which opens forwardly at its lower end with an intake chamber portion 103 formed by the bottom portion 104 of casing 49 and the chamber wall 105 cast therewith, the chamber portion 103 communicating freely at its forward outlet 106 with the reservoir or sump 107 in the casing 49. The chamber portion 103 constitutes a pocket-like portion of the reservoir 107 and is of substantially less capacity than the reservoir. This reservoir preferably communicates by the system of passages at 108 through the casings 44, 49 and the intermediate member 50, with the reservoir 45 in the main transmission B so that the lubricating oil stored therein may pass freely between the transmission mechanisms B and A.

The inlet chamber portion 103 functions, as will presently be apparent, to circulate the oil to the pump J which has been delivered from this pump to the motor G, such additional oil as may be necessary being drawn from the reservoir 107. This has a particular advantage, especially in cold weather, in facilitating operation of the mechanism by quickly "warming-up" only a portion of the oil which is circulated by the pump J to the motor G and thence returning to the pump in advance of warming-up all of the oil in the reservoir 45 and 107. The oil is originally drawn from chamber 107 and flows through passage 102 to the pump inlet 100, the pump delivering the oil under pressure to the outlet port 101 whence the oil is delivered (Figs. 9 and 10) downwardly through a discharge passage 109 formed in casing 92 and then forwardly at the bottom of the passage to a delivery passage 110 formed in casing 49.

The delivery passage 110 (Figs. 9 and 12) extends transversely of the mechanism A to the side thereof opposite that which is viewed in Fig. 1 for delivery at 111 to the inlet 112 of the valve K which is adapted to control the delivery of the pressure fluid from the pump to the motor G and also the venting of the fluid from the motor G directly back to the chamber portion 103 for recirculation to the pump J.

Referring to Figs. 6 and 11, the casing 92 is adapted to receive the usual speedometer gears 113 and 114, the casing 92 providing a chamber 115 from which lubricant is conducted by gravity through a passage 116 back to the reservoir 107.

Referring to Figs. 6, 9 and 10, we have provided means for controlling the rate of pressure fluid build-up from the pump J to determine the vehicle speed at which the pump will deliver fluid under sufficient pressure to operate motor G, this means also operating to relieve any excess pressure delivered by the pump.

This pressure controlling and relieving means comprises a valve casing 117 having a passage 118 open to the pressure delivery passage 109, the casing 117 being formed with a seat 119 for a valve 120 yieldingly urged toward seat 119 by a spring 121 whose compression is adjustably controlled by a threaded abutment plug 122. The valve casing is provided with the fluid escape ports 123 and spaced outwardly therefrom we have provided the second series of pressure relief ports 124. The ports 123 function to permit a certain amount of the oil delivered by the pump to escape so that the vehicle will be driven in the direct drive up to a predetermined desired speed in advance of delivery of oil under sufficient pressure to cause operation of the motor G. In Fig. 10 the valve 110 is illustrated as being unseated so that oil is being delivered from the pump to the motor G although the oil pressure has not yet been built-up sufficiently to operate motor G. The parts as illustrated in Fig. 6 are arranged for a direct drive, the vehicle being accelerated so that as the oil pressure builds-up, the valve 120 will be moved outwardly to uncover the ports 123. As the pump J increases its pressure fluid delivery, it will reach a point where the oil pressure is sufficient to operate the motor G, any excess oil delivery causing further outward movement of valve 120 to uncover the relief ports 124.

By suitably proportioning the various parts and passages together with the value of spring 121, and the size of pump J, it will be apparent that the motor G may be arranged to operate at any desired speed of travel of the vehicle. We preferably arrange this critical speed at a relatively low value in comparison with overdrive devices heretofore used commercially in order to obtain the benefits of economy and quietness of drive attendant to the overdrive. As will presently be more apparent, we have provided means for conveniently manipulating the mechanism A from the overdrive back to the direct drive whenever it is desired to accelerate the car more quickly than would be possible in the overdrive. Our arrangement enables the use of the overdrive for city driving as well as for country driving and we therefore preferably arrange the parts so that the overdrive will automatically take place at a car speed of 10 to 25 miles per hour, by way of example, the critical speed being preferably arranged at approximately 20 miles per hour in order to obtain the benefits of city driving. If desired, the parts may be arranged to provide for the overdrive at much higher car speeds in the neighborhood of 40 or 45 miles per hour, for example, or at any other desired speeds.

Referring to Figs. 6, 8 and 13, the pressure fluid from the valve K is delivered to the motor G by a port 125 which slopes transversely inwardly of the transmission and upwardly for delivery at 126 to a longitudinally extending passage 127 and thence through the communicating curved passage 128 for delivery at the rear end of cylinder 90. A plug 129 is secured by a fastener 130, this plug closing off the forward portion of the passage 127 which may be conveniently drilled from the forward end of the casing 49.

When the valving means K is operated, as will presently be apparent, to relieve the fluid pressure at motor G, then the fluid drains back through passages 128, 127 to the valve from whence the fluid drains through a port 131 and the inwardly and downwardly sloping drain passage 132 and thence through the rearwardly extending passage 133 which opens at 134 (Fig. 6) into the inlet chamber portion 103 for recirculation to the pump J as aforesaid.

Referring now to the valving means K, we have provided an arrangement for controlling the supply of pressure fluid from the pump J to the motor G preferably by a plurality of means operable independently of each other under control of the vehicle driver. One of these means provides what may be termed a dash control on the valve in that the driver by operating this means at the dash or other convenient point manipulates the valve so that the overdrive is rendered inoperative under all driving conditions or else so that the overdrive is allowed to automatically function in response to the driving speed of the vehicle in conjunction with the other driver controlled means for the valve.

The second driver operable control on the valve, referred to above, is preferably arranged for operation in conjunction with the usual engine throttle operating means and more particularly we have provided a control in the form of a kick-down control by the accelerator pedal. By preferance this control is so arranged that the accelerator pedal has the customary range of movement for manipulating the engine throttle valve between its fully opened and fully closed positions, the mechanism incorporating a lost motion or over-travelling device accommodating kick-down movement of the accelerator pedal beyond the aforesaid throttle opening range of movement, the overtravelling range being utilized to manipulate the valve to drain the pressure fluid from the motor G and thereby forego a change in the mechanism A from the overdrive to the direct drive.

This transmission change is therefore obtained by a natural impulse of the driver in depressing the accelerator pedal as far as it will go in order to obtain the more beneficial direct speed ratio in accelerating the car faster than is possible in the overdrive ratio. Our kick-down control is furthermore so arranged by preference that when the valve has been operated by an overtravelling movement of the accelerating pedal, the valve is not restored to its position for reestablishing the overdrive until the accelerator pedal is substantially fully released thereby avoiding undesired changes back and forth between the overdrive and the direct drive.

Referring now to the valving means K, we have provided a casing 135 secured by fasteners 136 to the far side of the casing 49 as viewed in Fig. 1, this casing being formed with the aforesaid passages 112 and 132. The casing is also provided with a longitudinally extending cylinder 137 which slidably receives the valve member 138 which is provided with forward and rear heads 139 and 140 respectively. These heads slidably engage the cylinder 137 and between them the valve member is formed with a reduced portion 141 which provides the annular fluid conducting chamber 142 longitudinally between the heads 139 and 140.

The forward end of the cylinder 137 is closed by a plug 143 slidably receiving a valve actuating rod 144 which extends rearwardly axially through the valve member 138 and terminates in a head 145 for moving the valve member forwardly with the rod 144. The valve member is yieldingly urged rearwardly against the head 145 by a spring 146 which acts between the head 139 and plug 143. This plug is provided with a ball detent 147 yieldingly urged inwardly by the spring 148 to selectively engage the grooves 149 and 150 formed in the rod 144. In order to limit rearward movement of rod 144 under the action of spring 146, the rod 144 is fitted with a collar 151 engaged by the yoked end portion 152 of a downwardly extending lever 153 pivotally mounted at 154 to a forwardly extending bracket 155 of the casing 135.

At the forward end of rod 144 there is provided an abutment 156 engaging the forward face of the lever yoked portion 152 whereby the rod 144 will follow the swinging movement of lever 153.

The rear end of the head 140 carries an abutment closure plug 157 engaged by a lever 158 secured to a rock shaft 159 which projects laterally outwardly from the lever housing portion 160 of casing 135 where the rock shaft 159 has secured thereto a second lever 161 (Fig. 12) for operating the valve member 138.

Referring now to the aforesaid dash control means for the valve member 138, we have illustrated in Fig. 1 a portion of the usual instrument panel 162 of the vehicle fitted with an operating handle or knob 163 connected with the Bowden wire mechanism 164, the other end of which is connected at 165 with the downward end of the aforesaid lever 161. It will be apparent that when the knob 163 is pulled rearwardly by the driver, the Bowden wire mechanism 164 will operate to swing lever 161 forwardly, thereby causing a corresponding swinging movement of lever 158, thus moving the valve member 138 forwardly against the action of spring 146. In order to yieldingly hold the valve member in this forward position, the mounting for the Bowden mechanism in the instrument panel 162 is provided with a detent mechanism 166.

When the parts are positioned as in Figs. 1 and 13, the valve member 138 is positioned so that its chamber 142 establishes communication with the pressure fluid inlet 112 and the delivery port 125 is supplying pressure fluid from the pump J to the motor G. It will also be noted that the head 139 closes the drain outlet 131 from communication with the port 125.

Assuming that it is desired to prevent operation of the overdrive so that the vehicle will be driven in sustained direct drive, the operator pulls the knob 163 thereby moving the valve member 138 forwardly until head 140 closes the pressure inlet port 112, the head 139 at the same time being moved forwardly sufficiently so that valve passage 142 establishes communication between port 125 and the drain port 131 whereby the fluid will drain from the motor G back to the chamber portion 103. When the valve member is in this forward position, the pressure from the inlet port 112 is preferably arranged to act with a balanced action on the valve member so that the latter may be readily moved rearwardly and to this end the cylinder 137 is provided with an annular groove 167 communicating with inlet port 112, this groove being closed by the head 140 and preventing any side thrust to act against the valve member under the aforesaid conditions.

When the operator pushes the knob 163 back to the Fig. 1 position, then the spring 146 acts to restore the valve to the Fig. 13 position at which time the overdrive is rendered operative. Referring now to the kick-down control on the valve, the lever 153 has connected thereto at 168 the rear end of a Bowden wire mechanism 169, the forward end of which is connected to the forward end of a lever 170 (Figs. 1 and 3). This lever is fixed to a transversely extending shaft 171 to which is likewise fixed the downwardly extending segment 172 formed with an arcuate slot 173. Loosely mounted on shaft 171 is a lever 174 pivoted at 175 with a link 176 articulated to the accelerator pedal 177 which is yieldingly urged in its raised or throttle-closing position by a spring 178.

The lever 174 carries a laterally inwardly extending pin 179 slidable in the arcuate groove 173, the parts being so proportioned that when the accelerator pedal 177 is depressed throughout its throttle opening range, then the pin 179 will be brought to the forward end of the slot 173 without causing any movement of the segment 172. However, when the accelerator pedal 177 is further depressed beyond its wide-open throttle position and through the kick-down range of accelerator pedal movement, the pin 179 then causes the segment 172 to rotate to the position thereof indicated at 172'. This movement operates through rod 171 to swing the lever 170 upwardly acting through the Bowden wire mechanism 169 to swing lever 153 forwardly pulling the rod 144 until groove 150 thereof is engaged with the detent 147. This movement of rod 140 causes the head 145 to move the valve 138 forwardly against the action of spring 146 to push the valve member 138 to vent the motor G just as previously described for venting this motor by pulling the knob 163 although it will be apparent that the kick-down operation of the accelerator pedal is independent of operation of the dash control.

The detent 147 is sufficiently strong to hold the valve member 138 in the forward venting position against the action of spring 146, although the spring 178 is strong enough to release the detent 147 when the accelerator pedal 177 is fully released. Thus when the accelerator pedal 177 is released from the kick-down operation, the segment 172 remains in the kick-down position 172' until the accelerator pedal nears the end of its throttle-closing position at which time the pin 179 engages the rear end of slot 173 at which time the spring 178 causes the segment 172 to be restored to the Fig. 3 position, the detent 147 then engaging the groove 149 as in Fig. 13.

We have also provided suitable means accommodating the kick-down operation of the accelerator pedal while at the same time adjusting the engine throttle valve in the customary manner for movements of the accelerator pedal throughout the normal throttle adjusting range. Referring to Figs. 1, 3 and 4, the engine C is provided with the customary intake manifold 180 for supplying the mixture of air and gasoline from the carburetor 181 through the manifold riser 182 under control of the butterfly valve 183 rotatably adjusted by a lever 184 adapted to be swung against a stop pin 185 when the throttle valve is in its fully open position.

Pivoted to the lower end of lever 184 by a pivot pin 186 is a member 187 provided with a guideway 188 slidably receiving the forward end of a rod 189 which extends rearwardly for pivotal connection at 175 to the aforesaid lever 174 and link 176. A collar 190 is fixed to rod 189, a spring 191 yieldingly urging separation of member 187 and collar 190 within the limits provided by a bracket 192 which engages the forward end of member 187 and which has a flange 193 slidably receiving rod 189 and providing an abutment for the rear face of collar 190.

The spring 191 is sufficiently strong so that it affords a positive or non-yielding connection between rod 189 and member 178 for movements of the accelerator pedal 177 throughout the range of adjustment of the throttle valve 183. However, when the accelerator pedal is depressed to the end of its throttle opening range to bring the lever 184 against the stop 185, then further depression of the accelerator pedal throughout the kick-down range of movement causes the rod 189 to slide forwardly in the guideway 188 of member 187, the collar 190 compressing spring 191 to allow the accelerator pedal to overtravel the throttle valve. As will be apparent, when the accelerator pedal is released from the kick-down range, then the spring 191 causes the collar 190 to engage the bracket flange 193 so that further release of the accelerator pedal will cause a corresponding closing movement of the throttle valve 183. When the accelerator pedal is operated in its kick-down range of movement, the additional resistance which is encountered by compressing the spring 191 serves to advise the driver of this condition of control and also to prevent accidental manipulation of the kick-down control when not desired.

We have also provided means for utilizing the pressure fluid delivery from pump J to lubricate parts of the mechanism A. Referring to Fig. 6, the pump cover plate 98 is formed with an annular groove 194 which has an extension passage 195 placing the groove 194 in communication with the fluid which is being pumped adjacent the delivery passage 101 so that a portion of this high pressure fluid will continuously pass to the annular groove 194 whenever the vehicle is in motion. The latter groove is in continuous communication with a passage 196 formed in the driving pump member 93. The passage 196 in turn is in continuous registration with a radial passage 197 formed in a driven shaft 25 by reason of the fixed relationship of pump driving member 93 and shaft 25. The radial passage 197 communicates with a delivery tube 198 which bridges the gap between shaft 25 and the rear end portion 52 of driving shaft 37 so that the oil is continuously delivered from the tube 198 forwardly into an axial bore 199 of driving shaft portion 52. At the forward end of the bore 199 there is provided a radial outlet 200 which supplies the oil to the rear end of an external thread-like lubricant-conducting groove 201 for lubricating the aforesaid bearing material 69 of the gear 68 and its hub 70.

The hub 70 is provided with a radial outlet 202 for conducting lubricant from the groove 201 outwardly for distribution to the splines 71 and 72 and rearwardly to the teeth of sun gear 68 to lubricate the planetary gearing, it being noted that the oil from the outlet 202 will also be directed toward the clutch teeth 75 especially when the sleeve 73 is moved forwardly for maintaining these clutch teeth lubricated. The direction of the thread-like groove 201 is such that the oil will be pumped rearwardly of the driving shaft portion 52 as the driving shaft rotates in its normal forward direction.

In the normal operation of the power transmission we will assume that the motor vehicle is being accelerated with the main transmission being manipulated for a direct drive by engaging the clutch 42 with the direct drive clutch teeth 31; also that the dash control 163 is positioned as in Fig. 1 to enable operation of the overdrive. Under such conditions the vehicle will be accelerated in the direct drive through mechanism A, the sleeve 73 being positioned as in Fig. 6 to clutch the sun gear 68 with the carrier 61.

As the vehicle accelerates the pump J will build up a pressure fluid under control of the valve 120 (Fig. 10) until at a predetermined speed of vehicle travel the pressure fluid delivered from the pump through the valve means K to the motor G causes the latter to operate while the direct drive is taking place. At such a time the mechanism A will be automatically manipulated in response to this predetermined speed of vehicle travel to cause operation of the braking device F to disengage clutch teeth 74 and 75 and hold the sun gear 68 against rotation to provide the overdrive.

When the speed of the vehicle, while in overdrive, drops below the critical speed of the pump J, then the pressure of the fluid at motor G will fall off to release the overdrive and immediately establish the direct drive either at the overrunning clutch E or at the teeth 74, 75 as aforesaid.

When driving in overdrive the operator may at any time quickly and without shock to the transmission parts or to the occupants of the vehicle, manipulate the mechanism A for the kickdown operation to establish the direct drive by compressing the accelerator pedal 177 beyond the wide-open throttle range to manipulate the valving means K to vent the motor G and thereby attain the direct drive either at the overrunning clutch E or at the teeth 74, 75. After the kickdown operation has taken place, the overdrive is not restored until the accelerator pedal 177 is approximately fully released to its throttle closing position whereupon the valving means K will be restored to the Fig. 13 position to again establish the overdrive provided that the speed of the vehicle is above the critical speed of rotation of pump J necessary to supply the fluid under pressure for operating the motor G.

When it is desired to drive the vehicle with the mechanism A operating in sustained direct drive, then the driver pulls the dash knob 163 to manipulate the valve means K so that the motor G is constantly drained regardless of the speed of rotation of the pump J.

Referring to Fig. 14 we have illustrated a somewhat modified embodiment of our invention which may be used in lieu of the mechanism illustrated in Fig. 6 which, for the most part, is not changed. In Fig. 14 we have therefore illustrated only a portion of the Fig. 6 mechanism in order to illustrate the parts which are modified.

The sun gear 68' in this instance is adapted to slide along the driving shaft 37, the clutch teeth 74' now being drivingly connected to the sun gear 68' by forming the same integrally with the sun gear hub 70'.

The carrier member 61' is provided with a forward extension 203 which is formed with the internal clutch teeth 75' and the brake disc 80' is fixed as before to the hub 70' but is now provided with a series of slots, one of which is illustrated at 204, for receiving the extension fingers 205 of a spring abutment 206. A spring 207 corresponds to the aforesaid spring 78 in that this spring yieldingly urges engagement of the clutch teeth 74' and 75'. The operation of the Fig. 14 device is substantially identical to that illustrated in Fig. 6 except that when the motor G operates then the disc 80' moves forwardly along with hub 70' and sun gear 68' as a unit to disengage teeth 74' and 75' and then hold the sun gear 68' stationary, it being understood that the sun gear 68' always maintains its mesh with the planet pinions 64. As before, the contacting faces of the teeth 74' and 75' are preferably inclined as illustrated in Fig. 5 for the corresponding teeth 74 and 75 of the Fig. 6 embodiment.

We do not limit our invention, in the broader aspects thereof, to any particular combination and arrangement of parts such as shown and described for illustrative purposes since various modifications will be apparent from the teachings of my invention and scope thereof as defined in the appended claims.

What we claim is:

1. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake and cause operation of the overdrive without interruption in the drive from the engine to the vehicle; and means operable in response to driver manipulation of said accelerator pedal for operating said valve to control pressure fluid supply to said fluid-actuated brake.

2. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver manipulation of said accelerator pedal in the direction of throttle valve opening for operating said valve to shut off the supply of pressure fluid to said fluid-actuated brake to effect release of the latter.

3. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver manipulation of said accelerator pedal in the direction of throttle valve closing for operating said valve to admit the pressure fluid to said fluid-actuated brake to effect engagement of the latter.

4. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver manipulation of said accelerator pedal in the direction of throttle valve opening for operating said valve to shut off the supply of pressure fluid to said fluid-actuated brake to effect release of the latter; and means operable in response to driver manipulation of said accelerator pedal in the direction of throttle valve closing for operating said valve to admit the pressure fluid to said fluid-actuated brake to effect engagement of the latter.

5. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling said throttle valve; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver operation of said throttle valve actuator in said second range of movement for operating said valve to shut off the supply of pressure fluid to said fluid-actuated brake to effect release of the latter.

6. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling said throttle valve; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver operation of said throttle valve actuator in said second range of movement for operating said valve to shut off the supply of pressure fluid to said fluid-actuated brake to effect release of the latter; said valve operating means acting to restore said valve to admit the pressure fluid to said fluid-actuated brake when said throttle valve actuator is released from its first said range of movement.

7. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling said throttle valve; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable in response to driver operation of said throttle valve actuator in said second range of movement for operating said valve to shut off the supply of pressure fluid to said fluid-actuated brake to effect release of the latter; said valve operating means acting to restore said valve to admit the pressure fluid to said fluid-actuated brake but not until said throttle valve actuator is released to approximately its closed throttle valve position.

8. In a motor vehicle having an engine provided with a throttle valve; an accelerator pedal operably connected to said throttle valve for adjustment thereof by the vehicle driver; a driving shaft; a driven shaft; secondary driving means for driving the driven shaft from and faster than the driving shaft, comprising, planetary gearing having a planet pinion and carrier therefor adapted to be driven from the driving shaft, a sun gear meshing with the planet pinion and an internal gear meshing with the planet pinion and adapted to transmit said faster drive to the driven shaft; primary driving means comprising a clutch having a member thereof operable to connect said sun gear and carrier so as to rotate the driven shaft at a speed equal to the speed of the driving shaft; said secondary driving means including a pressure fluid-actuated brake operable for restraining rotation of said sun gear; said fluid-actuated brake including a movable brake member non-rotatably connected to said sun gear and to said clutch member; means including a valve for supplying fluid under pressure to said fluid-actuated brake to move said brake member and thereby operate said clutch member to disengage said clutch and to operate said fluid-actuated brake; and means operable in response to driver manipulation of said accelerator pedal for actuating said valve to effect release of said fluid-actuated brake.

9. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; yielding means acting to engage said clutch means; a fluid-actuated brake operable in opposition to said yielding means to disengage said clutch means and to restrain rotation of the sun gear for effecting an overdrive from the driving shaft to the driven shaft; means including a valve for supplying fluid under pressure to said fluid-actuated brake during said direct drive thereby to operate said brake and cause operation of the overdrive without interruption in the drive from the engine to the vehicle; and means operable in response to driver manipulation of said accelerator pedal for operating said valve to control pressure fluid supply to said fluid-actuated brake.

10. In a motor vehicle having an engine provided with a throttle valve; an accelerator pedal operably connected to said throttle valve for adjustment thereof by the vehicle driver; a driving shaft; a driven shaft; secondary driving means for driving the driven shaft from and faster than the driving shaft, comprising, planetary gearing having a planet pinion and carrier therefor adapted to be driven from the driving shaft, a sun gear meshing with the planet pinion and an internal gear meshing with the planet pinion and adapted to transmit said faster drive to the driven shaft; primary driving means comprising a clutch having a member thereof operable to connect said sun gear and carrier so as to rotate the driven shaft at a speed equal to the speed of the driving shaft; said secondary driving means including a pressure fluid-actuated brake operable for restraining rotation of said sun gear; said fluid-actuated brake including a movable brake member non-rotatably connected to said sun gear and to said clutch member; means including a valve for supplying fluid under pressure to said fluid-actuated brake to move said brake member and thereby operate said clutch member to disengage said clutch and to operate said fluid-actuated brake; yielding means acting in opposition to pressure fluid movement of said brake member for operating said clutch member to engage said clutch; and means operable in response to driver manipulation of said accelerator pedal for actuating said valve to effect release of said fluid-actuated brake.

11. In a drive for a motor vehicle; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; two sets of clutch teeth respectively fixed to rotate with the sun gear and with the pinion carrier, said sets of clutch teeth being engageable with each other to drivingly clutch the sun gear with the pinion carrier for locking the planetary gearing to effect a direct drive from the driving shaft to the driven shaft; a fluid-actuated brake operable to disengage said sets of clutch teeth and to restrain rotation of the sun gear for effecting an overdrive from the driving shaft to the driven shaft; means operable in response to predetermined speed of vehicle travel for delivering fluid under pressure to said fluid-actuated brake during said direct drive thereby to operate said brake and cause operation of the overdrive without interruption in the drive from the engine to the vehicle; and means under control of the vehicle driver for controlling said pressure fluid delivery to said fluid-actuated brake.

12. In a drive for a motor vehicle; a driving shaft; a driven shaft; secondary driving means for driving the driven shaft from and faster than the driving shaft, comprising, planetary gearing having a planet pinion and carrier therefor adapted to be driven from the driving shaft, clutch teeth rotating with said carrier, a sun gear meshing with the planet pinion and an internal gear meshing with the planet pinion and adapted to transmit said faster drive to the driven shaft; primary driving means comprising a clutch having a toothed member thereof operable to engage said clutch teeth thereby to connect said sun gear and carrier so as to rotate the driven shaft at a speed equal to the speed of the driving shaft; said secondary driving means including a pressure fluid-actuated brake operable for restraining rotation of said sun gear; said fluid-actuated brake including a movable brake member non-rotatably connected to said sun gear and to said toothed clutch member; means including a valve for supplying fluid under pressure to said fluid-actuated brake to move said brake member and thereby operate said toothed clutch member to disengage the teeth thereof from said clutch teeth and to operate said fluid-actuated brake; an overrunning clutch operating between said shafts to prevent the driving shaft from rotating faster than the driven shaft and to accommodate rotation of the driven shaft faster than the driving shaft; and means under control of the vehicle driver for operating said valve to control pressure fluid supply to said fluid-actuated brake.

13. In an overdrive for motor vehicles having an engine throttle-controlling accelerator pedal operable by the vehicle driver, a driving shaft, a driven shaft, planetary gearing operably connecting said shafts for driving said driven shaft from and at a speed greater than said driving shaft, said planetary gearing including a sun gear and a planet pinion carrier adapted to be driven from the driving shaft, said carrier having a set of clutch teeth, a second set of clutch teeth operable to engage the first said set of clutch teeth thereby to positively connect said sun gear with said carrier for driving the driven shaft from and at the same speed as the driving shaft, braking means for said sun gear, fluid pressure operated means for disengaging said sets of clutch teeth and actuating said braking means, an overrunning clutch operating between said shafts to prevent the driving shaft from rotating faster than the driven shaft and to accommodate rotation of the driven shaft faster than the driving shaft; and means operable in response to driver operation of said accelerator pedal for controlling pressure fluid supply to said fluid pressure operated means.

14. In an overdrive for motor vehicles, a driving shaft, a driven shaft, planetary gearing operably connecting said shafts for driving said driven shaft from and at a speed greater than said driving shaft, said planetary gearing including a sun gear and a planet pinion carrier adapted to be driven from the driving shaft, said carrier having a set of clutch teeth, a second set of clutch teeth operable to engage the first said set of clutch teeth thereby to positively connect said sun gear with said carrier for driving the driven shaft from and at the same speed as the driving shaft, braking means for said sun gear, an overrunning clutch operating between said shafts to prevent the driving shaft from rotating faster than the driven shaft and to accommodate rotation of the driven shaft faster than the driving shaft; and fluid pressure operated means for disengaging said sets of clutch teeth and actuating said braking means.

15. In a drive for a vehicle having an engine throttle-controlling actuator operable by the vehicle driver, driving means adapted to receive drive from the engine, means driven by said driving means and adapted to drive the vehicle, overdriving means including planetary gearing intermediate said driving and driven means for driving said driven means at a speed greater than that of said driving means, a clutch operable to connect said driving means and driven means by locking said planetary gearing, yielding means acting to engage said clutch, pressure fluid operated braking means for effecting operation of said intermediate driving means, fluid governor means for controlling operation of said braking means at a speed proportionate to that of the vehicle, and means operable by driver operation of said throttle-controlling actuator for releasing said braking means to render said intermediate driving means inoperative.

16. In a power transmission for a motor vehicle having an engine throttle-controlling actuator operable by the vehicle driver, a driving shaft adapted to receive drive from the engine, a driven shaft adapted to drive the vehicle, overdriving means including planetary gearing between said shafts for driving said driven shaft at a speed greater than the speed of the driving shaft, said planetary gearing including a rotatable drive-reaction-taking gear element, pressure fluid operated braking means for holding said gear element against rotation, a clutch adapted to connect said shafts for a direct drive by locking the planetary gearing, yielding means for engaging said clutch, fluid governor means for controlling operation of said braking means at a speed proportionate to that of the vehicle, and means operable in response to driver operation of said throttle-controlling actuator for effecting release of said braking means.

17. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, a clutch for controlling the last said drive, means providing an additional drive through the transmission faster than that provided by the first said driving means, a pressure fluid motor operable to disengage said clutch and to control said faster drive means, means for supplying fluid under pressure to said motor for operating the same when said throttle-valve actuator is operated in said range of movement, and means operable in response to operation of said throttle-valve actuator beyond said range of movement for effecting release of said motor from said pressure fluid operation.

18. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, a pressure fluid motor operable to control said drive means, means including a valve for supplying fluid under pressure to said motor for operating the same when said throttle-valve actuator is operated by the driver in said range of movement, means operable independently of said pressure fluid supplying means providing an additional drive through the transmission slower than that provided by the first said drive means, a clutch for controlling said slower drive, means operable in response to driver operation of said throttle-valve actuator beyond said range of movement for operating said valve to effect release of said motor from said pressure fluid operation, and yielding means acting to engage said clutch, said motor operating in opposition to said yielding means for disengaging said clutch.

19. In a drive for a motor vehicle having an engine provided with a throttle-valve actuator operable by the vehicle driver, a transmission for driving the vehicle from the engine in a plurality of variable speed ratio drives, means providing a relatively fast drive through the transmission, means operable to control said relatively fast drive means for effecting operation and release thereof, means including a positively engageable clutch providing an additional drive through the transmission slower than said relatively fast drive, said additional driving means including an overrunning clutch operating to synchronize the members of said positively engageable clutch, yielding means acting on said clutch to establish said relatively slow drive upon operation of said control means to effect release of said relatively fast drive, and means operable in response to driver operation of said throttle-valve actuator for operating said relatively fast drive control means.

20. In a drive for a motor vehicle having an engine provided with a throttle-valve actuator operable by the vehicle driver, a transmission for driving the vehicle from the engine in a plurality of variable speed ratio drives, means providing a relatively fast drive through the transmission, pressure fluid operating means operable to control said relatively fast drive means for effecting operation and release of said relatively fast drive, means including a valve for supplying fluid under pressure to said pressure fluid operating means, means operable in response to driver operation of said throttle-valve actuator for operating said valve to effect release of said relatively fast drive, and means including a positively engageable clutch operable in response to release of said relatively fast drive for providing an additional drive through the transmission slower than that provided by said relatively fast drive means, said additional driving means including an overrunning clutch operating to synchronize the members of said positively engageable clutch, said clutch including a clutching member adapted for clutch releasing operation by said pressure fluid operating means.

21. In a drive for a motor vehicle having an engine provided with a throttle-valve actuator operable by the vehicle driver, a transmission for driving the vehicle from the engine in a plurality of variable speed ratio drives, means providing a relatively fast drive through the transmission, means including a fluid-actuated device for controlling said relatively fast drive to effect operation and release thereof, valving means operable from a first position of pressure fluid supply to said fluid-actuated device to a second position for venting said fluid-actuated device, means including a lost motion mechanism for operating said valving means from said first position to said second position in response to driver operation of said throttle-valve actuator to effect release of said relatively fast drive, and means providing an additional drive through the transmission slower than said relatively fast drive when said valving means is operated as aforesaid to effect release of said relatively fast drive, said slower drive means including a clutch having a clutching member adapted for clutch releasing operation by said fluid actuated device.

22. In a motor vehicle power transmission; a driving shaft; a driven shaft; a planet pinion having a carrier adapted to be driven by one of said shafts, said carrier having clutch teeth; an internal gear meshing with the planet pinion and adapted to drive the other of said shafts; an axially slidable sun gear meshing with said pinion and having a controlling hub; clutch teeth carried by said hub and adapted to clutchingly engage the teeth of the carrier for driving the driven shaft from the driving shaft at a 1 to 1 ratio; yielding means urging said hub into its clutching position; and pressure fluid operating means for sliding said sun gear in the direction of its axis thereby moving said hub into its declutched position and to restrain rotation of the sun gear to cause the driving shaft to drive the driven shaft at an overdrive ratio.

23. In a motor vehicle power transmission; a driving shaft; a driven shaft; a planet pinion having a carrier adapted to be driven by one of said shafts, said carrier having clutch teeth; an internal gear meshing with the planet pinion and adapted to drive the other of said shafts; a sun gear meshing with said pinion and having a controlling hub; a clutch member slidably engaging said hub and having clutch teeth adapted to clutchingly engage the teeth of the carrier for driving the driven shaft from the driving shaft at a 1 to 1 ratio; yielding means urging said clutch member into its clutching position; a brake disk carried by said hub and extending outwardly therefrom; a frictional abutment adapted to be engaged by said brake disk; an annular piston surrounding said hub; and means for supplying pressure fluid to said piston for causing the latter to move the brake disk into engagement with said frictional abutment thereby moving said clutch member into its declutched position and establishing an overdrive from the driving shaft to the driven shaft.

24. In a power transmission for driving a motor vehicle having a driver operable engine-throttle-actuator, a driving shaft, a driven shaft, means for driving the driven shaft from the driving shaft, said driving means including a clutch for controlling said drive, means for driving the driven shaft from the driving shaft at a speed ratio different than that provided by the first said drive, the second said driving means including a brake for controlling said different speed ratio drive, means operating automatically in response to the attainment of a predetermined vehicle speed to release said clutch and engage said brake thereby to release the first said drive and establish the other of said drives, and means operable in response to driver operation of said throttle-actuator for acting on said automatically operating means so as to control engagement and release of said clutch and said brake only when the vehicle is travelling at a speed above that aforesaid.

25. In a power transmission for driving a motor vehicle having a driver operable accelerator pedal, a driving shaft, a driven shaft, means for driving the driven shaft from the driving shaft, said driving means including a clutch for controlling said drive, means for driving the driven shaft from the driving shaft at a speed ratio different than that provided by the first said drive, the second said driving means including a brake for controlling said different speed ratio drive, pressure fluid operated means operating automatically in response to the attainment of a predetermined vehicle speed to release said clutch and engage said brake to release the first said drive and establish the other of said drives, a valve controlling delivery of pressure fluid from the pump to said fluid operated means, and means operable in response to driver operation of said accelerator pedal for controlling operation of said valve thereby to effect engagement and release of said clutch and said brake only when the vehicle is travelling at a speed above that aforesaid.

26. In a power transmission for driving a motor vehicle, a driving shaft, a driven shaft, means for driving the driven shaft from the driving shaft, said driving means including a clutch for controlling said drive, means for driving the driven shaft from the driving shaft at a speed ratio different than that provided by the first said drive, the second said driving means including a brake for controlling said different speed ratio drive, pressure fluid operated means adapted to release said clutch and engage said brake during operation of the first said drive to release this drive and establish the other of said drives, a pump drivingly connected with the driven shaft for supplying pressure fluid to operate said fluid operated means when the speed of the vehicle reaches a predetermined value, a valve controlling the supply of pressure fluid from the pump to said fluid operated means, and a plurality of means selectively operable by the vehicle driver for operating said valve.

27. In a drive for a motor vehicle having an engine provided with a throttle valve; an accelerator pedal operably connected to said throttle valve for adjustment thereof by the vehicle driver; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; means operable in response to driver manipulation of said accelerator pedal for operating said valve to control pressure fluid supply to said fluid-actuated brake; and means operable by the driver independently of manipulation of said accelerator pedal for operating said valve to control pressure fluid supply to said fluid-actuated brake.

28. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling said throttle valve; a driving shaft; a driven shaft; planetary gearing comprising, a planet pinion having a carrier adapted to be driven from the driving shaft, a sun gear meshing with the planet pinion, and an internal gear meshing with the planet pinion and adapted to transmit drive to the driven shaft; clutch means engageable to drivingly clutch the sun gear with the pinion carrier for locking the planetary gearing to effect a direct drive from the driving shaft to the driven shaft; a fluid-actuated brake operable to disengage said clutch means and to restrain rotation of the sun gear for effecting an overdrive from the driving shaft to the driven shaft; means including a valve for supplying fluid under pressure to said fluid-actuated brake during said direct drive thereby to operate said brake; and means operable by the driver independently of driver operation of said throttle valve actuator for operating said valve to shut off the supply of pressure fluid to said fluid-actuated brake.

29. In a motor vehicle having an engine provided with a throttle valve; an accelerator pedal operably connected to said throttle valve for adjustment thereof by the vehicle driver; a driving shaft; a driven shaft; secondary driving means for driving the driven shaft from and faster than the driving shaft, comprising, planetary gearing having a planet pinion and carrier therefor adapted to be driven from the driving shaft, a sun gear meshing with the planet pinion and an internal gear meshing with the planet pinion and adapted to transmit said faster drive to the driven shaft; primary driving means comprising a clutch having a member thereof operable to connect said sun gear and carrier so as to rotate the driven shaft at a speed equal to the speed of the driving shaft; said secondary driving means including a pressure fluid-actuated brake operable for restraining rotation of said sun gear; said fluid-actuated brake including a movable brake member nonrotatably connected to said sun gear and to said clutch member; means including a valve for supplying fluid under pressure to said fluid-actuated brake to move said brake member and thereby operate said clutch member to disengage said clutch and to operate said fluid-actuated brake; means operable in response to driver manipulation of said accelerator pedal for actuating said valve to effect release of said fluid-actuated brake; and means operable by the driver independently of driver manipulation of said accelerator pedal for actuating said valve.

30. In an overdrive for a motor vehicle having an engine throttle-controlling accelerator pedal operable by the vehicle driver, a driving shaft, a driven shaft, planetary gearing operably connecting said shafts for driving said driven shaft from and at a speed greater than said driving shaft, said planetary gearing including an axially shiftable sun gear having a hub portion provided with clutch teeth, a planet pinion carrier adapted to be driven from the driving shaft and having clutch teeth engageable with the clutch teeth of said sun hub portion for driving the driven shaft from and at the same speed as the driving shaft, a frictional abutment, said hub portion having a brake disk, pressure fluid operating means acting to shift said sun gear to disengage the teeth of said sun hub portion from the teeth of said carrier and then engage said brake disk with said frictional abutment, and means operable in response to driver operation of said accelerator pedal for controlling pressure fluid supply to said fluid operating means.

31. In a power transmission for a motor vehicle, a driving shaft, a driven shaft, planetary gearing operably connecting said shafts for driving said driven shaft from and at a speed greater than said driving shaft, said planetary gearing including an axially shiftable sun gear having a hub portion provided with clutch teeth, a planet pinion carrier adapted to be driven from the driving shaft and having clutch teeth engageable with the clutch teeth of said sun hub portion for driving the driven shaft from and at the same speed as the driving shaft, a frictional abutment, said hub portion having a brake disk, pressure fluid operating means acting to shift said sun gear to disengage the teeth of said sun hub portion from the teeth of said carrier and then engage said brake disk with said frictional abutment, and means under control of the vehicle driver for controlling pressure fluid supply to said fluid operating means.

32. In a power transmission for driving a motor vehicle having an engine; a driving shaft adapted to be driven by the engine; a driven shaft adapted to drive the vehicle; change speed mechanism including clutch-controlled means for driving the driven shaft from the driving shaft at a relatively slow speed and means for driving the driven shaft from the driving shaft at a speed relatively faster than that provided by said relatively slow speed driving means; a clutch for controlling said relatively slow speed driving means; pressure fluid operated means for disengaging said clutch and effecting operation of said relatively fast driving means; fluid pumping means for delivering pressure fluid to said fluid operated means; means for driving said fluid pumping means independently of the engine so that in stopping the vehicle with the engine running the pressure of the fluid will drop below that required to operate said fluid operated means; and yielding means operated to engage said clutch to effect said relatively slow speed drive independently of said fluid pumping means for starting the vehicle, said clutch operating to release the relatively slow speed drive in response to operation of said fluid operated means in effecting said relatively fast speed drive to provide a step-up in the drive through said change speed mechanism when said fluid pumping means operates to restore the pressure of the fluid after the vehicle is started.

33. In a power transmission according to claim 32, means for regulating the rate of pressure fluid build-up of the fluid pumping means when the vehicle is started.

34. In a motor vehicle power transmission, a forwardly rotatable driving shaft having an axial lubricant conducting bore in an end portion thereof, said driving shaft having an external thread-like groove for pumping lubricant along said shaft away from said end portion, said shaft having a lubricant passage between said bore and one end of said thread-like groove, a driven shaft, change speed mechanism operably connecting said shafts and including a part to be lubricated, and means for directing lubricant from said thread-like groove toward said part.

35. In a motor vehicle power transmission, a forwardly rotatable driving shaft having an axial lubricant conducting bore in an end portion thereof, said driving shaft having an external thread-like groove for pumping lubricant along said shaft away from said end portion, said shaft having a lubricant passage between said bore and one end of said thread-like groove, a driven shaft, a pump carried by the driven shaft for supplying lubricant under pressure to said bore, means for conducting lubricant from said pump to said bore, a sun gear having a hub surrounding said thread-like groove and having an opening for conducting lubricant from this groove through said hub, and mechanism operably connecting said sun gear with said driven shaft and including a part adapted to be lubricated by the lubricant conducted through said hub opening.

36. In a motor vehicle power transmission, a driving shaft, a driven shaft, change speed mechanism operably connecting said shafts and including a pressure fluid operated drive controlling device, a valve, a pump, means for conducting pressure fluid from said pump to said device under control of said valve, a fluid reservoir having a main fluid storage portion and a pocket-like inlet chamber portion of a capacity substantially less than that of the main storage portion, means for conducting lubricant from said inlet chamber portion to said pump, and means under control of said valve for returning fluid from said device directly to said pocket-like chamber portion for delivery to said pump, said pocket-like chamber portion freely communicating with the main storage portion of said reservoir.

37. In a motor vehicle power transmission, a driving shaft, a driven shaft, planetary gearing operable between said shafts, said gearing comprising a pair of gear elements, relatively movable sets of clutch teeth respectively drivingly connected to each of said gear elements and adapted to be clutched together, brake means comprising a stationary friction surface and a shiftable friction surface, a pressure fluid operated piston operably associated with said shiftable surface for thrusting the same toward said stationary surface, a plate having a portion disposed between said surfaces and a second portion operably connected with one of said sets of clutch teeth, said shiftable surface being adapted to shift the first said plate portion toward said stationary portion thereby shifting the last mentioned set of clutch teeth into a declutched position.

38. In a drive for a motor vehicle having an engine provided with a throttle valve actuator operable by the driver throughout a range of movement in adjusting the throttle valve between its fully opened and closed position; means accommodating driver operation of said throttle valve actuator throughout its said throttle opening range of movement and therebeyond in a second range of movement; a driving shaft; a driven shaft; means operably connecting said shafts for driving the driven shaft from the driving shaft at relatively slow and fast speed ratios, said driving means including a clutch part for controlling the slow speed ratio drive; a drive control device shiftable from a position of clutching engagement with said clutch part for effecting the slow speed ratio drive to a second position for effecting the fast speed ratio drive; brake means for holding said drive control device against rotation in its said second position; means operable in response to driver operation of said throttle valve actuator in said second range of movement for releasing said brake means; and means operable to restore operation of said brake means subsequently to operation of the last said means but not until said throttle valve actuator is released to approximately its closed throttle valve position.

CARL A. NERACHER.
WILLIAM T. DUNN.
AUGUSTIN J. SYROVY.
TENO IAVELLI.